(12) United States Patent
Rose

(10) Patent No.: US 7,103,546 B2
(45) Date of Patent: Sep. 5, 2006

(54) AUTOMATIC RECOGNITION OF COMPANY NAMES IN SPEECH UTTERANCES

(75) Inventor: Georg Rose, Duesseldorf (DE)

(73) Assignee: Koninklijke Philips Electronics, N.V., Eindhoven (NL)

( * ) Notice: Subject to any disclaimer, the term of this patent is extended or adjusted under 35 U.S.C. 154(b) by 707 days.

(21) Appl. No.: 09/923,610

(22) Filed: Aug. 7, 2001

(65) Prior Publication Data
US 2002/0032565 A1 Mar. 14, 2002

(30) Foreign Application Priority Data
Aug. 8, 2000 (DE) .............................. 100 38 517

(51) Int. Cl.
*G10L 15/08* (2006.01)
*G10L 15/22* (2006.01)
*G06F 17/20* (2006.01)

(52) U.S. Cl. ..................... 704/251; 704/240; 707/5
(58) Field of Classification Search ............... 704/231, 704/236, 239, 240, 243, 244, 251, 255, 256, 704/257; 707/1, 2, 3, 4, 5
See application file for complete search history.

(56) References Cited

U.S. PATENT DOCUMENTS

| | | | |
|---|---|---|---|
| 5,212,730 A | | 5/1993 | Wheatley et al. |
| 5,390,278 A | | 2/1995 | Gupta et al. |
| 5,839,107 A | * | 11/1998 | Gupta et al. ............... 704/270 |
| 5,978,755 A | * | 11/1999 | Podhradsky ............... 704/201 |
| 6,026,398 A | * | 2/2000 | Brown et al. ............... 707/5 |
| 6,081,774 A | * | 6/2000 | de Hita et al. ............... 704/9 |
| 6,134,548 A | * | 10/2000 | Gottsman et al. ............... 707/5 |
| 6,199,099 B1 | * | 3/2001 | Gershman et al. ........... 709/203 |
| 6,202,062 B1 | * | 3/2001 | Cameron et al. ............... 707/3 |
| 6,285,981 B1 | * | 9/2001 | Kao ............................ 704/256 |
| 6,292,778 B1 | * | 9/2001 | Sukkar ....................... 704/256 |
| 6,311,182 B1 | * | 10/2001 | Colbath et al. ............... 707/6 |
| 6,324,513 B1 | * | 11/2001 | Nagai et al. ................. 704/275 |
| 6,446,076 B1 | * | 9/2002 | Burkey et al. ............... 707/102 |
| 6,567,778 B1 | * | 5/2003 | Chao Chang et al. ....... 704/257 |
| 6,574,595 B1 | * | 6/2003 | Mitchell et al. ............ 704/242 |
| 6,601,026 B1 | * | 7/2003 | Appelt et al. .................. 704/9 |
| 6,694,055 B1 | * | 2/2004 | Wu ............................. 382/185 |
| 6,745,161 B1 | * | 6/2004 | Arnold et al. ................. 704/7 |
| 6,778,979 B1 | * | 8/2004 | Grefenstette et al. .......... 707/3 |
| 6,847,972 B1 | * | 1/2005 | Vernau et al. .............. 707/101 |
| 6,885,736 B1 | * | 4/2005 | Uppaluru .................. 379/88.17 |
| 6,910,003 B1 | * | 6/2005 | Arnold et al. ................. 704/4 |

FOREIGN PATENT DOCUMENTS

EP 0645757 A1 3/1995

OTHER PUBLICATIONS

Sukkar et al., "Reducing computational complexity and response latency through the detection of contentless frames," 2000 IEEE International Conference on Acoustics, Speech, and Signal Processing, 2000. Jun. 5, 2000-Jun. 9, 2000. vol. 6, pp. 3751 to 3754.*
Rivlin et al., "A phone-dependent confidence measure for utterance rejection," 1996 IEEE International Conference on Acoustics, Speech, and Signal Processing, May 7, 1996-May 10, 1996, vol. 1, pp. 515 to 517.*

* cited by examiner

*Primary Examiner*—Martin Lerner

(57) ABSTRACT

A method of automatic recognition of company names in speech utterances includes generating at least one word sequence hypothesis by a speech recognizer from a speech utterance consisting of one or more words, comparing the word sequence hypothesis with the entries representing company names stored in a database, and selecting, in dependence on the result of the comparison, one company name as a recognition result.

7 Claims, 1 Drawing Sheet

AUTOMATIC RECOGNITION OF COMPANY NAMES IN SPEECH UTTERANCES

The invention relates to a method of automatic recognition of company names in speech utterances. The invention also relates to a dialogue system, more particularly, an inquiry system comprising a processing unit for the automatic recognition of company names in speech utterances.

In dialogue or inquiry systems such as, for example, in telephone inquiry systems, the recognition of company names causes particular problems. These problems are based on the fact that users, when pronouncing company names, more often than not do not stick to a predefined fixed format or a certain syntax. For example, parts of a company name are often omitted when entered, abbreviations are formed, acronyms are used or also parts of the company name are exchanged. This leads to unsatisfactory results during the automatic recognition of company names.

Therefore, it is an object of the invention to reduce the error rate during the automatic recognition of company names in speech utterances.

The object is achieved by a method as claimed in claim 1 and a dialogue system as claimed in claim 7.

The recognition results of a speech recognizer customarily used, which still show a high error rate, are subjected to a post-processing according to the invention. For this purpose, a database is used in which all the company names permissible for the respective application are stored. By utilizing the database information, for example ridiculous speech recognition results can be corrected. Also a selection can be made of the best recognition result from many different recognition result alternatives produced by the speech recognizer.

Preferably, the legally correct form of the company names is stored in the database. A word sequence hypothesis produced by the speech recognizer, or a list N of best word sequence hypotheses, respectively, is then compared to the database entries. A search is then made in the database for the word sequence hypotheses as a whole and for parts of the word sequence hypotheses. With the results of the search, a company name stored in the database is now selected as a recognition result while the word sequence hypothesis(es) produced by the speech recognizer is (are) taken into account. If the speech recognizer produces only one word sequence hypothesis for each speech utterance entered, and if no company name can be found that is completely represented in this word sequence hypothesis, a company name will be selected that contains at least partly the word sequence hypothesis. If the speech recognizer produces various word sequence hypotheses for a speech utterance, the comparison with the database entries is extended accordingly and the best word sequence hypothesis considering the company names stored in the database is determined.

Advantageous embodiments of the invention are defined in the dependent claims.

These and other aspects of the invention are apparent from and will be elucidated with reference to the embodiments described hereinafter.

Figure 1:
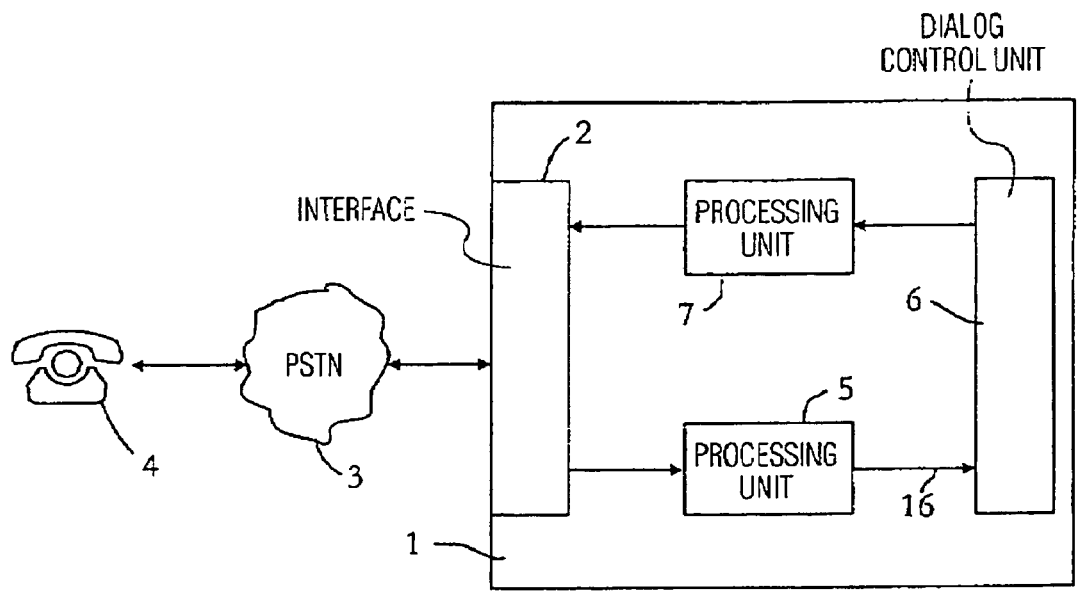
FIG. 1 shows a dialogue system connected to the public telephone network.

The dialogue system 1 shown in FIG. 1, or a telephone directory system, respectively, is coupled to a public telephone network (PSTN) 3 via an interface 2, so that a user can access the dialogue system 1 via a telephone terminal 4. A speech utterance of a user can thus be applied via the telephone terminal 4, the public telephone network 3 and the interface 2 to a processing unit 5, which is used for converting speech into text. The processing unit 5 produces a recognition result, which is applied to a dialogue control unit 6, which unit 6 determines, in dependence on the respective application, a suitable speech output to be transmitted to the user. A speech signal to be outputted is generated by a processing unit 7 for conversion of text into speech (for example, speech synthesis unit), while the respective speech output depends on control signals which are transmitted to the processing unit 7 by the dialogue control unit 6.

Figure 2:
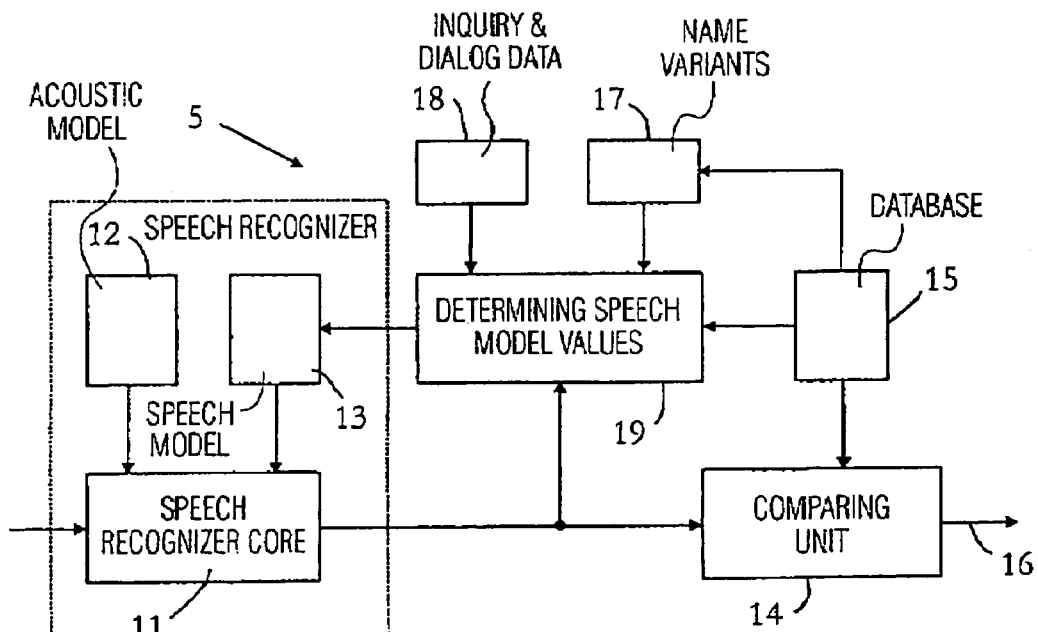
FIG. 2 shows a processing unit for the automatic recognition of company names in speech utterances, which is used in the dialogue system as shown in FIG. 1.

The processing unit 5 is particularly designed such that company names are recognized with a low error rate. The measures taken here are explained by the block diagram shown in FIG. 2, which diagram shows the embodiment of the processing unit 5. A speech utterance available as an electric signal and coming from the interface 2 is here evaluated by a speech recognizer 10 via a speech recognizer core 11 based on Hidden Markov Models (HMM) while use is made of an acoustic model 12 having acoustic references and a speech model 13. The speech recognizer 10 produces a word sequence hypothesis as a recognition result, which hypothesis contains one or more words describing a company name and, if necessary, still further words that can be evaluated for the recognition of a company name. Block 14 features a comparing unit which makes a comparison of the word sequence hypothesis produced by the speech recognizer 10 with entries of a database 15. In the database 15 are stored company names which are permissible for the respective application while, more particularly, the legally correct spelling is used. It is then advantageous to remove certain words laid down a priori and hardly contributing or not contributing at all to the distinction of company names (articles, often occurring filling words) from the legal names in the database 15—and, in consequence, also from the word sequence hypotheses of the speech recognizer 10—and discard them during the comparison in block 14. The database 15 then also contains entries having the respective abbreviated company names, where appropriate, which are then used instead of the unabbreviated company names as a basis for the comparison with a word sequence hypothesis. This is advantageous in that the comparison in block 14 is speeded up, because no evaluation takes place of these filling words. During the comparison in block 14, first a search is made for an entry stored in the database 15, which entry is completely contained in the word sequence hypothesis produced by the speech recognizer 10. If this is the case, this company name is issued as a recognition result 16. If this is not the case, a database entry will be searched for which contains a company name that is contained at least partly in the word sequence hypothesis. Preferably, certain parts of company names are then defined as particularly characteristic and receive, for example, a respectively large weight factor, which is taken into account in the comparison made in block 14. For example, with the company name of Philips GmbH, the part "Philips" will receive a higher weight factor than the part "GmbH". For the company name of "Deutsche Telekom", the part "Telekom" will receive a higher weight factor than the part "Deutsche". Words stored in the database 15, which are defined as words carrying no information that can be used for the recognition of a company name, are used to reduce the word sequence hypothesis by respective parts. Examples for such words are articles, prepositions, filling words and so on.

A search engine used for the comparison in block 14 works in the following way in a preferred embodiment: If a recognition result produced by the speech recognizer 10 exactly matches the entry in the database 15, this entry receives the highest score—other database entries, which only partly match, may then be issued as alternatives. Preferably, the speech recognizer 10 produces not only one word sequence hypothesis, but a plurality of N best word sequence hypotheses (N>1) for a speech utterance. These hypotheses are sorted in accordance with a probability determined by the speech recognizer 10, which is taken into account by the comparing unit 14. More particularly, for one speech utterance not only N best word sequence hypotheses are applied to the comparing unit 14, but, furthermore, a probability value for each word sequence hypothesis, while speech recognizers are used that deliver N best recognition results with respective probabilities $P_{Nbest}$ (company name). Also the comparing unit 14, by evaluating the entries of the database 15, produces probabilities $P_{comparing\ unit}$ (company name) for each company name found. The weighting of the final search results may then be made, for example, via the overall probability:

$$P(\text{company name}) = P_{Nbest}(\text{company name}) * P_{comparing\ unit}(\text{company name})$$

This is effected under the simplified assumption that the speech recognition and the comparing unit are statistically independent.

Block 19 features the determining of the speech model values of the speech model 13. In a training phase the entries of the database 15 are evaluated for this purpose. Improvements for the construction of the speech model 13 are achieved in that variants of the company names (block 17) stored in the database 15 defined a priori as appropriate (for example, appropriate mix-ups of parts of company names, colloquial formulations such as, for example, "Big Blue", and others) are entered during the training of the speech model 13. A further improvement of the training of the speech model 13 is obtained in that data, which were recovered from actual inquiries or dialogues, respectively, by means of dialogue systems already in use, are also entered during the training (these data are featured by block 18). They can be entered in two ways: on the one hand, in that they are simply added to the training material and, on the other hand, in that the frequencies contained therein of inquiries for certain companies are entered as weight factors (in the sense of a unigram) into the training material which consists of the pure database entries. Furthermore, an on-line adaptation of the speech model 13 is provided with the present speech recognizer 10, which adaptation leads to a further reduction of the error rate for the recognition of entered company names. For the on-line adaptation are used the word sequence hypotheses recovered by the speech recognizer 10 during the operation of the dialogue system. The algorithms for speech model adaptation are known, as are the algorithms for speech model training and these algorithms are combined in block 19.

The invention claimed is:

1. A method of automatic recognition of company names in speech utterances, comprising the steps of:
    storing entries including company names and variants of the company names in a database, the variants including at least one of mix-ups of part of company names, colloquial formulations of company names, abbreviations of company names, and acronyms of company names;
    generating at least one word sequence hypothesis by a speech recognizer from a speech utterance consisting of one or more words,
    comparing the word sequence hypothesis with the entries which represent company names stored in the database, wherein certain words defined a priori are not taken into account when a word sequence hypothesis is compared with entries of the database; and
    selecting a company name as a recognition result in dependence on the result of the comparison.

2. A method as claimed in claim 1, wherein the speech recognizer produces a probability value for each of the at least one word sequence hypothesis, which probability value is taken into account for the comparison.

3. A method as claimed in claim 1, further comprising the step of using word sequence hypotheses produced by the speech recognizer are used for an adaptation of a speech model utilized by the speech recognizer.

4. A method as claimed in claim 1, further comprising the step of utilizing, by the speech recognizer, a speech model which was trained with the aid of the information stored in the database.

5. A dialogue system, comprising a database storing entries including company names and variants of the company names, the variants including at least one of mix-ups of part of company names, colloquial formulations of company names, abbreviations of company names, and acronyms of company names, and a processing unit for automatically recognizing company names in speech utterances, which wherein the processing unit comprises:
    a speech recognizer, which is used for generating at least one word sequence hypothesis from a speech utterance consisting of one or more words,
    a comparing unit, which is provided for making a comparison of the at least one word sequence hypothesis with the entries stored in the database and for selecting a company name as a recognition result in dependence on the result of the comparison, wherein certain words defined a priori are not taken into account when a word sequence hynothesis is compared with entries of the database.

6. A method of automatic recognition of company names in speech utterances, comprising the steps of:
    storing entries including company names and variants of the company names in a database,
    generating at least one word sequence hypothesis by a speech recognizer from a speech utterance consisting of one or more words,
    finding entries in the database that are at least partially found in the word sequence hypothesis by comparing the word sequence hypothesis with the entries which represent company names stored in the database, wherein certain words defined a priori are not taken into account when a word sequence hypothesis is compared with entries of the database,
    producing a first probability for each entry found during the step of comparing, the probability being dependent on the number of words in each of the entries found in the word sequence hypothesis, wherein each word has a weight factor, particularly characteristic words having a large weight factor, the weight factor being taken into account in determining the probability for each entry, and
    selecting a company name as a recognition result in dependence on the result of the comparison and probability of each entry.

7. A method as claimed in claim 6, wherein the speech recognizer produces a second probability value for each of the at least one word sequence hypothesis, the first and second probability values being taken into account for the step of selecting.

* * * * *